US006641402B2

(12) United States Patent
Boggs

(10) Patent No.: US 6,641,402 B2
(45) Date of Patent: Nov. 4, 2003

(54) METHOD AND APPARATUS FOR TRAINING MEMORY

(76) Inventor: David Boggs, 4023 Paige St., Montecito Heghts, CA (US) 90031

( * ) Notice: Subject to any disclaimer, the term of this patent is extended or adjusted under 35 U.S.C. 154(b) by 0 days.

(21) Appl. No.: 10/092,060

(22) Filed: Mar. 5, 2002

(65) Prior Publication Data

US 2003/0170600 A1 Sep. 11, 2003

(51) Int. Cl.[7] .............................................. G09B 19/22
(52) U.S. Cl. ...................... 434/236; 434/258; 434/333; 273/273; 273/430
(58) Field of Search ................................ 434/258, 259, 434/128, 129, 236, 333, 428, 429; 273/273, 445, 432, 429, 430, 308

(56) References Cited

U.S. PATENT DOCUMENTS

| 4,123,051 | A | * | 10/1978 | Tsacoyannis | 273/429 |
| 4,349,197 | A | * | 9/1982 | Livick | 273/440 |
| 5,190,296 | A | * | 3/1993 | Sainsbury | 273/296 |
| 5,190,298 | A | * | 3/1993 | Lee et al. | 273/430 |
| 5,626,477 | A | * | 5/1997 | Adkison | 434/128 |
| 6,186,795 | B1 | * | 2/2001 | Wilson | 434/236 |

OTHER PUBLICATIONS

Robert Leighton, "Can You Remember Details?", Apr. 1984, Games Magazine, pp. 39 and 40.*

* cited by examiner

Primary Examiner—Kien T. Nguyen
(74) Attorney, Agent, or Firm—Michael Bak Boychuk

(57) ABSTRACT

A contest method and process are devised in which the memory faculties of the contestants are exercised by viewing a set of randomly selected symbol groupings for a first interval of time and thereafter the specific symbols and their groupings are recollected in a second interval of time. The symbol groupings may be inscribed on one of the faces of a set of flash cards which are then shuffled, dealt to each of the contestants and concealed. Then the dealt cards are revealed for the first time interval and following a delay or immediately thereafter the contestants are directed to list correctly the symbols and their groupings during the second time interval. The number of symbols groupings correctly recalled comprises the score.

9 Claims, 2 Drawing Sheets

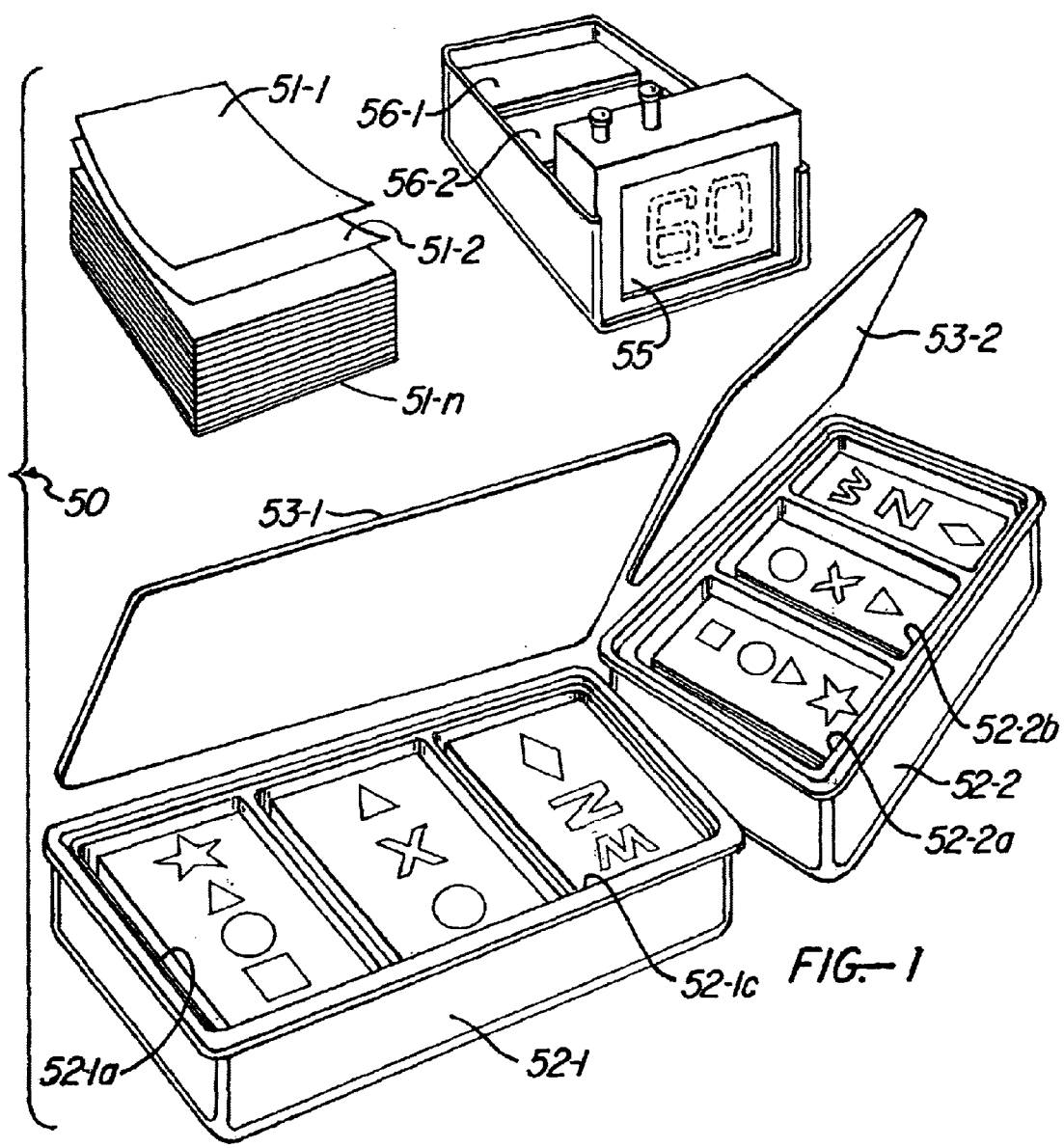
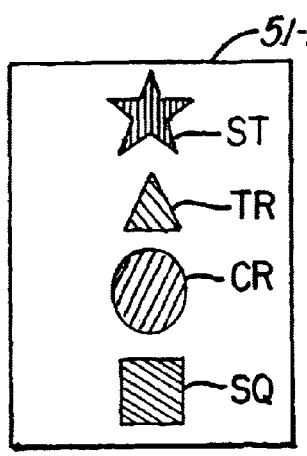
FIG.-2a
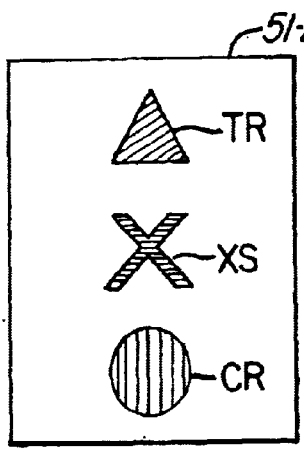
FIG.-2b
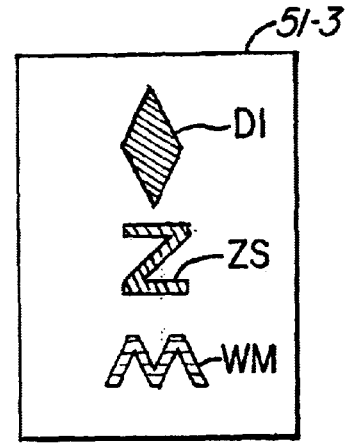
FIG.-2c

METHOD AND APPARATUS FOR TRAINING MEMORY

BACKGROUND OF THE INVENTION

1. Field of the Invention

The present invention relates to teaching aids, and more particularly to a method and apparatus for training human memory processes.

2. Description of the Prior Art

The use of flash cards as a training aid in the early stages of schooling has been known in the past, exemplified by flash cards designed to evoke certain sound patterns corresponding to the letters of the alphabet, word flash cards to promote correct spelling, numerical flash cards to memorize multiplication table, and so on. The association of flash cards with our learning processes is therefore well established. To further enhance interest and thus the efficacy of the learning process various methods and structures have been devised which combine flash cards in a game sequence such as the card games for learning the alphabet described in U.S. Pat. Nos. 6,276,940 to White, 5,524,899 to Haqedorn, 5,906,492 to Putterman and others. In each instance the flash card is used to indicate, and reinforce, an association between the characters or symbols on the card and some fact or word. Thus the primary utility of the flash card process is reinforcement of particular mental associations which only collaterally also reinforce the general facility of committing facts to memory.

Those in the art are familiar with the various analogs postulated for the human mind including those models that suggest a self coding process in which logical junctions are effectively formed along the path of conduction associated with a favored response. With repetition this analogical process refines and enlarges the number of junctions and thus refines the record of the information stored. This model, however, is best associated with logical organization and retention of information, or learning, and not with the speed at which such retention is effected, i.e., one mental attribute while most current thinking recognizes two central attributes of the physical brain in which the first, referred to above, is related to the quantity of material available for creating the junctions while the second relates to the efficiency of the junction forming process. Amongst these two functions the prior art flash card techniques favor the first, the junction forming process which is then further granulated and refined by the perceived logical nature of the association and even the architecture of the storage process itself, e.g., the architecture of speech. The second attribute related to the general facility with which junctions are formed has had little attention in the prior art.

The working or short term memory of a human brain entails processes that are often associated with one's state of health, age and mental well-being. Idioms and homilies like 'senior moment', 'absent-minded professor' and the like amply summarize the general observation that this part of one's mental faculties is subject to deterioration. Of course, the observations that have led to these general conclusions appear to be based on correct scientific underpinnings as recently supported in the separate works of Drs. Arvid Carlsson, Paul Greengard and Eric Kandel for which they shared the 2000 Nobel Prize in Physiology and Medicine. In essence Drs. Carlsson and Greengard found the chemical nature of all mental processes while Dr. Kandel confirmed this in his work focusing on heightened short term or working memory persistence that can be obtained through stress sensitization. The works of Drs. Carlsson and Greengard are now fully confirmed by the introduction of drugs like Prozac and L-dopa which the brain effectively converts to serotonin and dopamine. Dr. Kandel's work then carried further Dr. Greengard's phosphorylation deductions as the molecular basis for short term memory.

Thus there is now substantial confirmation of the junction analog for long term memory model of the human brain and the associative exercises of the current flash card teaching aids are well supported. Short term, or working, memory enhancement, however, has had little attention in the prior art and it is one such enhancement process that is described herein.

SUMMARY OF THE INVENTION

Accordingly, it is the general purpose and object of the present invention to provide a flash card memory exercise process in which the flash card images have no logical associative symbolism.

Other objects of the invention are to provide a short term or working memory exercise method in which various features of a plurality of flash cards are combined with flash card symbols having no logical association are combined and permutated to produce a large combinatorial result from any randomizing process like card shuffling.

Yet further objects of the invention are to provide an inexpensive array of devices useful in effecting a short term memory training method.

Additional objects of the invention are to provide a short term memory training method which is enhanced in its effects by the stress enhancing aspects of a contest.

Briefly, these and other objects are accomplished within the present invention by providing a set of flash cards each of a planform identical to the others and each of dimensions convenient for manual shuffling. One face of each flash card is then inscribed with a plurality of symbols randomly selected from a symbol set that includes a subset of vertically symmetrical symbols and a further subset that are not symmetrical. For example symbols that approximate the shape of the letter X or Z are vertically symmetrical as are symbols in the shape of a circle, a diamond or a square. Symbols following the shape of the letter W, however, are not and therefore are identified as an M or W depending on the orientation of the flash card as it is displayed. Other geometric symbols like a triangle or a five cornered star that are also vertically asymmetric are also useful within the present invention, providing further combination and permutation variety. Even further variety is obtained by way of randomly selected colors that are used to imprint each of the symbols.

The foregoing symbols may be randomly combined in groups of two, three, four or more symbols on the face of the flash cards which are then shuffled and dealt face up, in groups of two, three or more, into a particular concealment box assigned to corresponding contestants. The dealt cards in each of the concealment box are then exposed for a common first time period to each of the contestants who then have to precisely describe within a second time period each of the cards by way of the symbols thereon, their color, polarity and so on. Points are then awarded to the contestants depending on the number of cards correctly described. In this manner a limited card set can be effectively utilized in the course of many game repetitions to provide the necessary exercise stimulus to the short term or working memory of the contestants. The interval between the first period and the second period can be varied and may be increased as the memory facility of the contestants improves. Thus varying levels of temporal proximity can be tested in a process that is easily implemented and conveniently carried out.

BRIEF DESCRIPTION OF THE DRAWINGS

FIG. 1 is a perspective illustration, separated by parts, of the array of parts and devices useful in carrying out the inventive process;

FIGS. 2a through 2c are each an illustration of one exemplary flash card useful in the inventive process described herein.

DESCRIPTION OF THE PREFERRED EMBODIMENT

Figure 3:
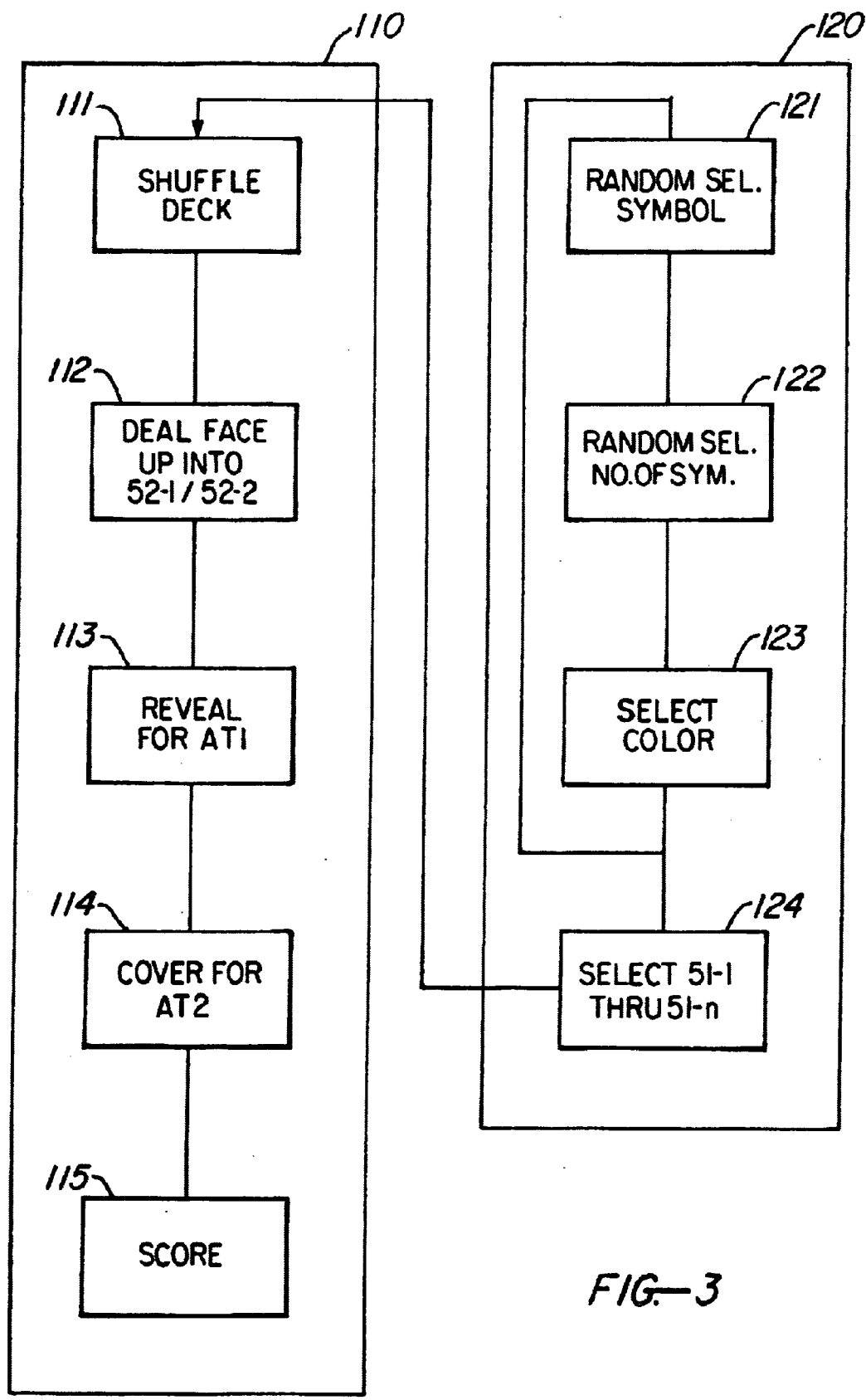
FIG. 3 is a sequence diagram illustrating the sequence of steps effected in accordance with the inventive short term memory exercise process described herein.

As shown in FIGS. 1 through 3 the inventive short term memory exercise sequence generally illustrated by the numeral 10, is effected with the use of an array 50 of articles and devices including a deck of flash cards 51-1 through 51-n each of a common planform substantially similar to the planform of playing cards, a first and second contestant's tray 52-1 and 52-2 each divided into a plurality of card receiving depressions 52-1a, b and c and 52-2a, b and c and a corresponding cover 53-1 and 53-2 dimensioned for placement over the trays to cover and conceal such cards as may have been placed into the depressions. Also included in the array is a stop watch or timer 55 and contestants' notepads 56-1 and 56-2 on which the contestants may inscribe such answers as are required in the course of the short term memory exercise sequence described hereinbelow.

Each of the cards 51-1 through 51-n is inscribed on one face thereof with a group of randomly chosen symbols selected in combination and permutation groups of two, three or four from subsets of vertically symmetrical symbols, vertically asymmetrical symbols and various color subsets. For example the symmetrical symbol set may comprise squares SQ, circles CR, diamond shapes DI, and shapes approximating the letter x XS or z ZS while the asymmetrical subset may include triangles TR, star shapes ST and symbols approximating the shape of w or m WM. As exemplified in FIGS. 2a, b and c the group of symbols randomly selected on the face of the dealt card 51-1 includes the asymmetrical star symbol ST, the asymmetrical triangle symbol TR, a circle CR and a square SQ. In FIG. 2b card 51-2 is, in turn, exemplified by symbols TR, XS and CR and in FIG. 2c the symbols DI, ZS and WM are shown inscribed on the face of card 51-3. Thus each of these three examples illustrates a vertically asymmetrical symbol grouping with the asymmetric alignment in the corresponding tray depressions 52-1a, b and c and 52-2a, b and c determining the symbol identification. Of course, randomly selected symbol combinations can also include a wholly symmetrical grouping of symbols. In addition to the foregoing combination and permutation variables there can be a further expanded by color. Thus the card symbols identified above can be further expanded in detail by selecting one of the colors like purple, orange, yellow, red, blue, green or black.

It will be appreciated that all the foregoing variables randomly combined in the above mentioned groupings of two, three or four symbols on a card. Of course, the number of combinations, permutations and variations that is thereby obtainable is extremely large and there is therefore a large number of card groupings that can effectively be collected into a single deck. The selection of the deck including cards 51-1 through 51-n is thus not limited by the limits of combination but is simply determined by the by their manipulative convenience where a number of around seventy appears to best serve this requirement. The purely random interrelationship of the symbols, however, assures an illogical symbol association, thus suppressing those mental processes associated with learning or long term memory organization and leaving only those facilities that combine in short term or working memory. Of course, this large pool of available further card decks discourages efforts at recalling any particular pattern By particular reference to FIG. 3 the inventive short term memory exercise process generally designated by the numeral 110 commences with step 111 in which the deck comprising cards 51-1 through 51-n is fully shuffled, face down, and thereafter cards are dealt from the top and face up, in step 112, into the corresponding depressions a, b and c of the respective trays 52-1 and 52-2 and then covered by the corresponding covers 53-1 and 53-2. In step 113 both the covers are lifted for a first time interval determined by timer 55, for example sixty seconds, and the dealt cards are then revealed to the contestants. At the end of this first time interval both the trays are covered again in step 114 and the contestants then must describe the contents of their respective tray during the course of a second time interval. This test of recollection may follow immediately step 113 or may be delayed by varying periods as the contestants facility at recollection is improved by repeated exercise. Then in step 115 the correctly identified cards are each accumulated and a score is awarded to the contestant from which a win or a loss is determined. In this manner the positive stressing functions of a contest are utilized to exercise the working or short term memory of each participant.

It will be appreciated that-the foregoing steps take benefit of a purely randomized symbol combinations effected by the use of any commercially available random number generation technique. Thus the sequence 110 may be nested in a sequence 120 which in step 121 randomly selects the symbol., in step 122 randomly selects the number of symbols to be applied on the particular card and in step 123 randomly selects the color therefor. Then in step 124 a deck comprising cards 51-1 through 51-n is randomly selected from the total cards thus generated. This purely random process confines the above contest to an exercise of the working memory only.

Obviously, many modifications and variations can be effected without departing from the spirit of the invention instantly disclosed. It is therefore intended that the scope of the invention be determined solely by the claims appended hereto.

It is claimed:

1. A method for training the memory faculties of a plurality of persons comprising the steps of:

applying a plurality of randomly selected symbol combinations to one of the faces of a group of flash cards, selected ones of said symbols including a geometric polarity and selected other ones of said symbols having a geometric symmetry;

shuffling said flash cards while aligned in an orientation to conceal said one surface thereof from view;

dealing a first group of said flash cards into a first concealment tray designated for a first one of said persons and a second group of said flash cards into a second concealment tray designated for a second one of said persons;

exposing said flash cards dealt into said first and second concealment tray to the corresponding ones of said first and second persons for a first interval of time;

concealing said exposed flash cards; and directing said first and second persons to identify within a second interval of time each said symbol combination exposed in the corresponding one of said trays during said first interval of time.

2. A method according to claim 1, wherein the step of directing said first and second persons includes the further step of:

delaying said second interval of time by a third interval of time following the occurrence of said first interval of time.

3. A method according to claim 2, wherein:

the step of applying a plurality of randomly selected symbol combinations includes selecting four or less separate symbols for each said symbol combination.

4. A method according to claim 3, wherein:

each said symbols are randomly varied by color.

5. A method for training the memory faculties of a persons engaged in a timed contest, comprising the steps of:

applying a plurality of randomly selected symbol combinations to one of the faces of a group of flash cards, each said symbol being applied in a randomly selected color, selected ones of said symbols further including a geometric polarity;

shuffling said flash cards while aligned in an orientation concealing said one surface thereof from view;

placing a first group of said flash cards into a first concealment tray designated for a first one of said persons and a second group of said flash cards into a second concealment tray designated for a second one of said persons;

exposing said flash cards placed into said first and second concealment tray to the corresponding ones of said first and second persons for a first interval of time;

concealing said exposed flash cards for a second interval of time; and directing said first and second persons to identify within said second interval of time each said symbol combination exposed in the corresponding one of said trays during said first interval of time.

6. A method according to claim 5, wherein the step of applying a plurality of randomly selected symbol combinations includes the further step of:

selecting four or less separate symbols for each said symbol combination.

7. A method according to claim 6, wherein the step of directing said first and second persons includes the further step of:

delaying said second interval of time by a third interval of time following the occurrence of said first interval of time.

8. A method according to claim 5, wherein the step of directing said first and second persons includes the further step of:

delaying said second interval of time by a third interval of time following the occurrence of said first interval of time.

9. A method according to claim 8, wherein the step of applying a plurality of randomly selected symbol combinations includes, the further step of:

selecting four or less separate symbols for each said symbol combination.

* * * * *